(12) United States Patent
George et al.

(10) Patent No.: US 12,030,378 B2
(45) Date of Patent: Jul. 9, 2024

(54) DRIVE SYSTEM FOR A VEHICLE

(71) Applicant: McLaren Automotive Limited, Woking (GB)

(72) Inventors: Sunoj George, Woking (GB); Roozbeh Bonyadi, Woking (GB); Stephen Johanson, Woking (GB); Oliver Nixon, Woking (GB); Stephen Carey, Woking (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 17/852,666

(22) Filed: Jun. 29, 2022

(65) Prior Publication Data

US 2023/0001786 A1 Jan. 5, 2023

(30) Foreign Application Priority Data

Jun. 30, 2021 (GB) .................................... 2109409

(51) Int. Cl.
*B60K 17/14* (2006.01)
*B60K 1/02* (2006.01)
(Continued)

(52) U.S. Cl.
CPC .............. *B60K 17/145* (2013.01); *B60K 1/02* (2013.01); *B60K 7/0007* (2013.01); *B60K 17/165* (2013.01); *B60K 2007/003* (2013.01)

(58) Field of Classification Search
CPC .. B60K 1/02; B60K 7/0007; B60K 2007/003; B60K 17/145; B60K 17/165
See application file for complete search history.

(56) References Cited

U.S. PATENT DOCUMENTS 1,984,830 A * 12/1934 Higley ...................... H02P 9/06
903/910
5,168,946 A * 12/1992 Dorgan ...................... B60L 7/22
475/5
(Continued)

FOREIGN PATENT DOCUMENTS

CN 205059312 3/2016
CN 105480069 4/2016
(Continued)

OTHER PUBLICATIONS

United Kingdom Search Report and Written Opinion in GB Appln. No. 2109409.9, dated Dec. 20, 2021, 4 pages.
(Continued)

*Primary Examiner* — Joseph Brown
(74) *Attorney, Agent, or Firm* — Fish & Richardson P.C.

(57) ABSTRACT

A drive system for a vehicle having a maximum speed, the drive system comprising: a first electric drive motor configured to drive both a first wheel and a second wheel of the vehicle; a differential coupled to the first electric drive motor, the differential being configured to split drive provided by the first electric drive motor so as to form a first drive path from the differential to the first wheel and a second drive path from the differential to the second wheel; a second electric drive motor positioned along the first drive path and configured to drive the first wheel; and a third electric drive motor positioned along the second drive path and configured to drive the second wheel; wherein each of the first, second and third electric drive motors are configured to provide drive up to the maximum speed of the vehicle.

17 Claims, 2 Drawing Sheets

(51) Int. Cl.
  *B60K 7/00*      (2006.01)
  *B60K 17/16*     (2006.01)

(56) References Cited

U.S. PATENT DOCUMENTS

| | | | |
|---|---|---|---|
| 5,453,930 A | 9/1995 | Imaseki et al. | |
| 2007/0012505 A1* | 1/2007 | Walter | B62D 11/14 |
| | | | 180/444 |
| 2010/0274427 A1 | 10/2010 | Ebuchi et al. | |
| 2011/0036658 A1* | 2/2011 | Cantemir | B60K 6/547 |
| | | | 180/65.245 |
| 2011/0259657 A1 | 10/2011 | Fuechtner | |
| 2015/0291057 A1 | 10/2015 | Ketfi-Cherif et al. | |

FOREIGN PATENT DOCUMENTS

| | | | |
|---|---|---|---|
| CN | 105966223 | 9/2016 | |
| CN | 106080157 | 11/2016 | |
| CN | 206394423 | 8/2017 | |
| CN | 108297676 | 7/2018 | |
| CN | 108394271 | 8/2018 | |
| CN | 112356647 | 2/2021 | |
| CN | 112477570 | 3/2021 | |
| DE | 10 2019 202994 | 9/2020 | |
| EP | 2119611 | 11/2009 | |
| EP | 3140144 | 3/2017 | |
| FR | 2954252 | 6/2011 | |
| WO | WO-02083483 A1 * | 10/2002 | ........... B60K 17/046 |
| WO | WO 2019/217619 | 11/2019 | |

OTHER PUBLICATIONS

Extended European Search Report in European Appln. No. 22181249.8, dated Nov. 29, 2022, 8 pages.

* cited by examiner

DRIVE SYSTEM FOR A VEHICLE

CROSS-REFERENCE TO RELATED APPLICATIONS

This application claims priority to GB Patent Application No. 2109409.9, filed on Jun. 30, 2021, the entire contents of which are hereby incorporated by reference.

BACKGROUND

This invention relates to a drive system for a vehicle. In particular, this invention relates to a drive system for an electric or hybrid vehicle.

FIG. 1 shows a vehicle. FIG. 1 shows a perspective view of vehicle 1. Vehicle 1 may be referred to as an automobile. Vehicle 1 may be referred to as a car.

The front of vehicle 1 is defined with reference to the primary direction of motion of vehicle 1. The front of vehicle 1 points in the primary direction of motion of vehicle 1. Generally, a vehicle has a primary motion direction that is in forward direction 5. The terms "front" and "rear" used herein are defined relative to, or with reference to, forward direction 5.

Vehicle 1 comprises a plurality of wheels. FIG. 1 shows wheels 2 and 4. Wheel 2 may be referred to as a front wheel. Wheel 4 may be referred to as a rear wheel. FIG. 1 primarily shows the left-hand-side of vehicle 1. The right-hand-side of vehicle 1 can be a mirror image. Vehicle 1 comprises a front axle (not shown) by which the front wheels rotate. Vehicle 1 comprises a rear axle (not shown) by which the rear wheels rotate.

Electric and hybrid vehicles are well known and are becoming increasingly prevalent as the desire to reduce carbon emissions increases. An electric vehicle may be defined as a vehicle having a drive system that comprises one or more electric drive motors for driving one or more wheels of that vehicle. A hybrid vehicle may be defined as a vehicle having a drive system that comprises one or more electric drive motors and an internal combustion engine for driving one or more wheels of that vehicle.

A vehicle's drive system is vital in determining the performance of that vehicle (e.g. its handling, acceleration, top speed and range). Thus, it would be desirable if there was an improved drive system for a vehicle.

SUMMARY OF THE INVENTION

According to a first aspect of the present invention there is provided a drive system for a vehicle having a maximum speed, the drive system comprising: a first electric drive motor configured to drive both a first wheel and a second wheel of the vehicle; a differential coupled to the first electric drive motor, the differential being configured to split drive provided by the first electric drive motor so as to form a first drive path from the differential to the first wheel and a second drive path from the differential to the second wheel; a second electric drive motor positioned along the first drive path and configured to drive the first wheel; and a third electric drive motor positioned along the second drive path and configured to drive the second wheel; wherein each of the first, second and third electric drive motors are configured to provide drive up to the maximum speed of the vehicle.

The differential may be configured to allow the first wheel to rotate at a different speed to the second wheel.

The drive system may comprise an input drive shaft along which the first electric drive motor is coupled; a first axle half-shaft along which the second electric drive motor is coupled; and a second axle half-shaft along which the third electric drive motor is coupled; wherein the differential connects the input drive shaft, the first axle half-shaft, and the second axle half-shaft.

The differential may be configured to transfer rotary motion of the input drive shaft driven by the first electric drive motor to the first axle half-shaft and the second axle half-shaft so as to, respectively, drive the first wheel and the second wheel.

The first axle half-shaft may be configured to transfer drive along the first drive path from the differential to the first wheel, and the second axle half-shaft is configured to transfer drive along the second drive path from the differential to the second wheel.

The first electric drive motor may be configured to drive: the input drive shaft; and via the differential, the first axle half-shaft and the second axle half-shaft; the second electric motor is configured to drive the first axle half-shaft; and the third electric motor is configured to drive the second axle half-shaft.

The drive system may not comprise a disengagement mechanism for disengaging the first electric drive motor from the input drive shaft.

The drive system may not comprise a disengagement mechanism for disengaging the second electric drive motor from the first axle half-shaft.

The drive system may not comprise a disengagement mechanism for disengaging the third electric drive motor from the second axle half-shaft.

The first, second and third electric drive motors may be packaged together with the differential.

According to a second aspect of the present invention there is provided a vehicle comprising a first wheel and a second wheel, and a drive system as described herein being configured to drive the first wheel and the second wheel.

The first wheel and the second wheel may be rear wheels of the vehicle.

The first wheel and the second wheel may be front wheels of the vehicle.

The first wheel may be coupled to the first axle half-shaft, and the second wheel may be coupled to the second axle half-shaft.

The vehicle may be an electric vehicle or a hybrid vehicle.

BRIEF DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Vehicle Overview

Figure 1:
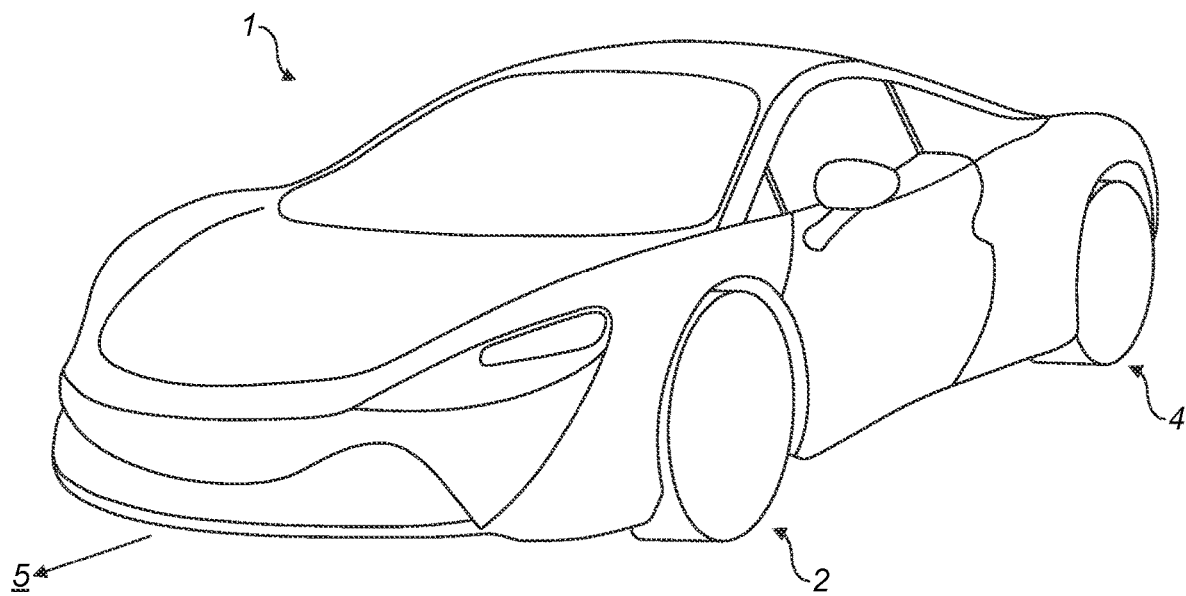
FIG. 1 shows a vehicle.
Figure 2:
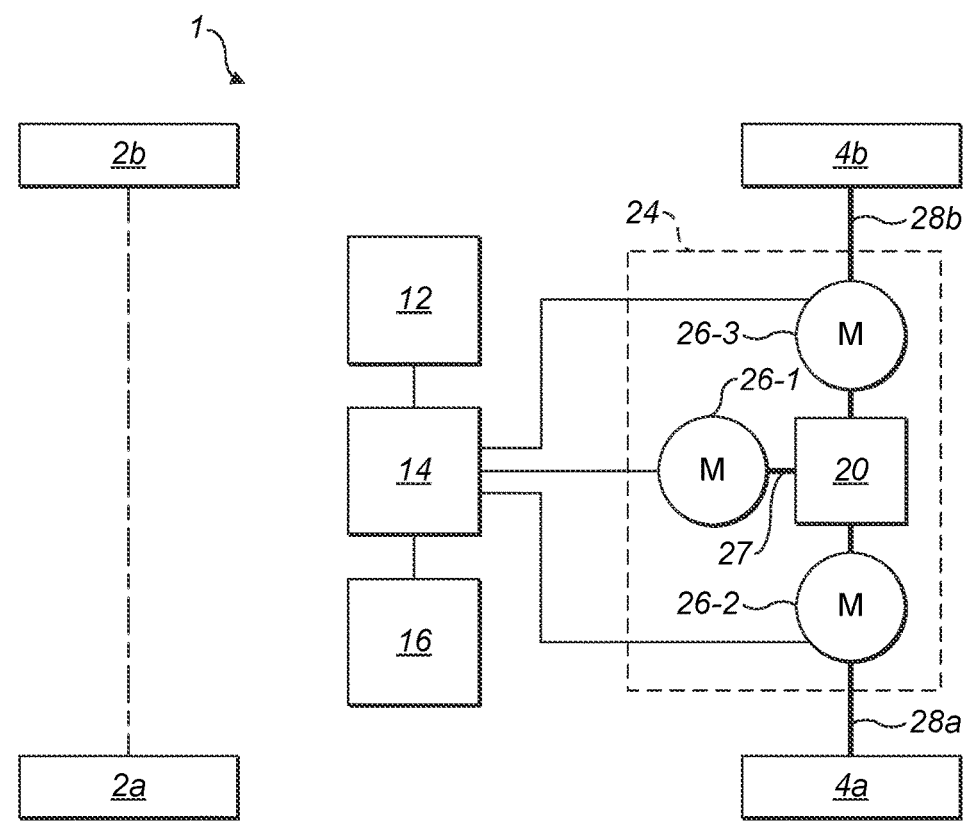
FIG. 2 shows the layout of a vehicle.

FIG. 2 shows the layout of a vehicle. Vehicle 1 comprises a plurality of wheels 2a, 2b, 4a and 4b. Vehicle 1 comprises a drive system 24 for driving wheels 4a and 4b. As will be described in further detail herein, drive system 24 comprises a first electric drive motor 26-1, a second electric drive motor 26-2, a third electric drive motor 26-3 and a differential 20. Vehicle 1 also comprises vehicle control system 12, motor control system 14 and an energy storage system 16.

Vehicle control system 12 may receive control inputs. For example, control inputs may include user inputs, such as throttle pedal inputs, brake pedal inputs, vehicle setting selections (such as the selection of a sport or economy mode, a launch control mode, or a level of traction control), or any other user inputs. Control inputs may also include other inputs, such as conditions sensed by the vehicle (e.g. external temperature, road condition, tyre condition, or current vehicle weight), or the level of available energy remaining in energy storage system 16. Vehicle control unit may forward said control inputs onto motor control system 14.

Vehicle control system 12 may comprise a processor and a non-volatile memory. Vehicle control system 12 may comprise more than one processor and more than one memory. The memory stores a set of program instructions that are executable by the processor, and reference data such as look-up tables that can be referenced by the processor in response to those instructions. The processor may be configured to operate in accordance with a computer program stored in non-transitory form on a machine readable storage medium. The computer program may store instructions for causing the processor to perform the operations of vehicle control system 12 in the manner described herein.

Motor control system 14 may control each of the first, second and/or third electric drive motors 26-1, 26-2 and 26-3. Motor control system 14 may comprise one or more motor control units (MCUs). For example, motor control system may comprise a separate motor control unit (MCU) for controlling each of first electric drive motor 26-1, second electric drive motor 26-2 and third electric drive motor 26-3. Each motor control unit (MCU) may receive control inputs for processing in order to determine appropriate control outputs for the respective electric drive motor that it controls. For example, a motor control unit may receive a torque demand from vehicle control system 12 (e.g. the torque demand being based on a measured throttle pedal position), calculate a control output for the electric drive motor it controls in dependence on the torque demand, and send the calculated control output to that electric drive motor so as to respond to the torque demand.

Motor control system 14 may comprise a processor and a non-volatile memory. Motor control system 14 may comprise more than one processor and more than one memory. The memory stores a set of program instructions that are executable by the processor, and reference data such as look-up tables that can be referenced by the processor in response to those instructions. The processor may be configured to operate in accordance with a computer program stored in non-transitory form on a machine readable storage medium. The computer program may store instructions for causing the processor to perform the operations of motor control system 14 in the manner described herein.

Energy storage system 16 may be configured to store electrical energy. For example, energy storage system 16 may comprise one or more batteries, supercapacitors and/or fuel cells. The motor control system 14 is connected to the energy storage system 16 to draw electrical energy from the energy storage system 16 to power each of the first, second and third electric drive motors 26-1, 26-2 and 26-3. Each of the first, second and third electric drive motors 26-1, 26-2 and 26-3 are configured to convert electrical energy into mechanical energy. Typically, electric motors operate through the interaction between a magnetic field and an electric current in a wire winding to generate force in the form of rotation of a shaft.

The first, second and third electric drive motors 26-1, 26-2 and 26-3 may be multi-phase (e.g. two-phase, three-phase or higher) electric drive motors. The first, second and third electric drive motors 26-1, 26-2 and 26-3 may be alternating current (AC) or direct current (DC) electric drive motors. The first, second and third electric drive motors 26-1, 26-2 and 26-3 need not be identical, and so one or more of those drive motors may be alternating current (AC) electric drive motors whilst the other(s) are direct current (DC) electric drive motors. The energy storage system 16 may output electrical energy in the form of direct current (DC) electricity. Therefore, in the case where one or more of the first, second and third electric drive motors 26-1, 26-2 and 26-3 are alternating current (AC) electric drive motors, the motor control system 14 may convert the electrical energy output from the energy storage system 16 to a form that can be used to power those electric drive motor. The motor control system 14 may comprise one or more DC/AC converters. The motor control system 14 may convert DC to three-phase AC.

It is to be understood that electrical energy may also be returned to the energy storage system 16 when the first, second and/or third electric drive motors 26-1, 26-2 and 26-3 are acting as generators.

In an example, wheels 2a and 2b are front wheels, and wheels 4a and 4b are rear wheels. In this example, vehicle 1 may be referred to as a rear-wheel drive vehicle. In another example, wheels 2a and 2b are rear wheels, and wheels 4a and 4b are front wheels. In this example, vehicle 1 may be referred to as a front-wheel drive vehicle. In both examples, wheels 2a and 2b may be coupled to a non-driven axle. A non-driven axle may passively rotate when motion of the vehicle on a drive surface causes a wheel coupled to that non-driven axle to rotate.

It is to be understood that the principles described herein need not be applied to a rear-wheel drive vehicle or a front-wheel drive vehicle as shown in FIG. 2. For example, the principles described herein can be applied to all-wheel drive vehicles having two driven axles. In an example, wheels 2a and 2b may also be driven by a drive system having the same architecture as drive system 24. In another example, wheels 2a and 2b may be driven by a drive system having a different architecture—such as a drive system comprising a single electric drive motor configured to drive both wheels 2a and 2b, or a drive system comprising first and second electric drive motors configured to drive wheels 2a and 2b, respectively.

It is to be understood that the principles described herein need not be applied to a vehicle comprising four wheels as shown in FIG. 2. In some examples, the vehicle may comprise fewer than four wheels. For example, the vehicle may be a motorcycle comprising three wheels. In some examples, the vehicle may comprise more than four wheels and/or more than two axles. For example, the vehicle may be a lorry.

It is to be understood that the principles described herein need not be applied to an electric vehicle as shown in FIG.

2. The principles described herein may be applied to a hybrid vehicle. For example, vehicle 1 may additionally comprise an internal combustion engine (not shown), and optionally one or more further electric drive motors (also not shown), for driving wheels 2a and 2b.

Drive System

Drive system 24 comprises a first electric drive motor 26-1, a second electric drive motor 26-2, a third electric drive motor 26-3 and a differential 20. First electric drive motor 26-1 is configured to drive both wheel 4a and wheel 4b. Differential 20 may permit drive to be delivered from first electric drive motor 26-1 to each of wheels 4a and 4b. Differential 20 may also permit wheel 4a to rotate at a different speed to wheel 4b (e.g. when vehicle 1 is cornering). Second electric drive motor 26-2 is configured to drive wheel 4a. That is, the primary purpose of second electric drive motor 26-2 is to drive wheel 4a—although it could also drive wheel 4b if differential 20 were a locking differential. Third electric drive motor 26-3 is configured to drive wheel 4b. That is, the primary purpose of third electric drive motor 26-3 is to drive wheel 4b—although it could also drive wheel 4a if differential 20 were a locking differential.

Drive system 24 may comprise an input drive shaft 27 along which the first electric drive motor 26-1 is coupled, a first axle half-shaft 28a along which the second electric drive motor 26-2 is coupled, and a second axle half-shaft 28b along which the third electric drive motor 26-3 is coupled. Differential 20 may connect input drive shaft 27, first axle half-shaft 28a, and the second axle half-shaft 28b. Wheel 4a may be coupled to the first axle half-shaft 28a, and wheel 4b may be coupled to the second axle half-shaft 28b.

First electric drive motor 26-1 may be configured to drive input drive shaft 27. Differential 20 may be configured to transfer rotary motion of the input drive shaft 27 driven by the first electric drive motor 26-1 to the first axle half-shaft 28a and the second axle half-shaft 28b so as to, respectively, drive wheel 4a and wheel 4b. That is, first electric drive motor 26-1 may be configured to drive, via differential 20, first axle half-shaft 28a and second axle half-shaft 28b.

Second electric motor 26-2 may be configured to drive first axle half-shaft 28a. Third electric motor 26-2 may be configured to drive second axle half-shaft 28b.

Figure 3:
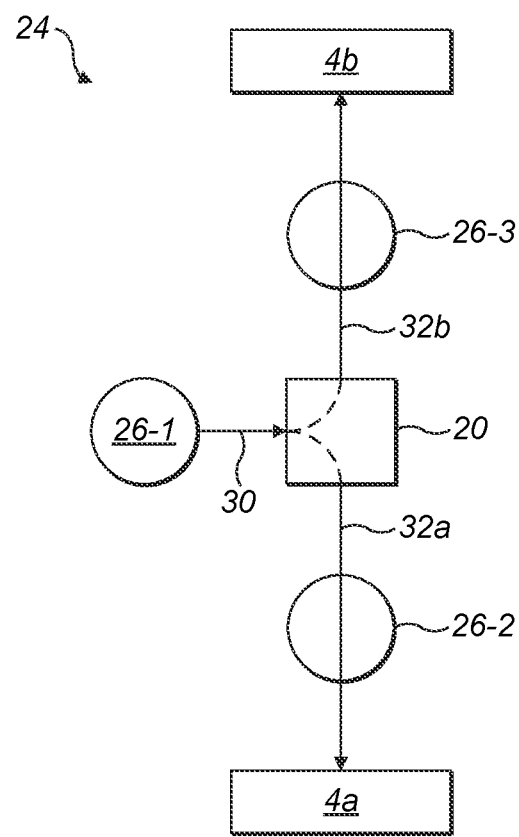
FIG. 3 shows a drive system.

In other words, with reference to FIG. 3 which shows drive system 24, differential 20 is coupled to the first electric drive motor 36-1. Differential 20 is configured to split drive 30 provided by the first electric drive motor 36-1 so as to form a first drive path 32a from the differential 20 to wheel 4a and a second drive path 32b from the differential 20 to wheel 4b. Second electric drive motor 26-2 is positioned along the first drive path 32a and configured to drive wheel 4a. Third electric drive motor 26-3 is positioned along the second drive path 32b and configured to drive wheel 4b.

An input drive shaft (e.g. input drive shaft 27 shown in FIG. 2) may be configured to transfer drive 30 from the first electric drive motor 36-1 to the differential 20. A first axle half-shaft (e.g. axle half-shaft 28a shown in FIG. 2) may be configured to transfer drive along the first drive path 32a from the differential 20 to wheel 4a. A second axle half-shaft (e.g. axle half-shaft 28b shown in FIG. 2) may be configured to transfer drive along the second drive path 32b from the differential 20 to the wheel 4b. It is to be understood that a skilled person would have no difficulty implementing, on instruction, a differential having the functionality described herein.

Arranging the first, second and third electric drive motors 26-1, 26-2 and 26-3 of drive system 24 in this way is advantageous because it enables large amounts of torque to be delivered to wheels 4a and 4b, whilst also enabling motor control system 14 to exert fine control over the torque applied to each of wheels 4a and 4b. For example, drive system 24 enables motor control system 14 to perform torque vectoring by using second and third electric drive motors 26-2 and 26-3 to apply different torques to each of wheels 4a and 4b respectively. This can significantly improve the handling of vehicle 1. Another advantage of this arrangement is that, in the event of a fault or failure of any one of the first, second and third electric drive motors 26-1, 26-2 and/or 26-3, both of wheels 4a and 4b can be driven by the remaining two motors.

Each of the first, second and third electric drive motors 26-1, 26-2 and 26-3 may have the same properties. That is, each of the first, second and third electric drive motors 26-1, 26-2 and 26-3 may be capable of delivering the same torque. Alternatively, the first, second and third electric drive motors 26-1, 26-2 and 26-3 may not have the same properties. For example, the first electric drive motors 26-1 may be capable of delivering greater torques so as to provide the majority of the drive to wheels 4a and 4b—whilst the second and third electric drive motors 26-2 and 26-3 may be capable of delivering lesser torques, and may be primarily used for applying torque adjustments to each of wheels 4a and 4b, respectively (e.g. during torque vectoring, as described herein).

Returning to FIG. 2, vehicle 1 has a maximum speed. For example, the maximum speed of vehicle 1 may be electronically limited to a predefined maximum speed. This may be a speed below a threshold speed at which vehicle 1 becomes unstable. Each of the first, second and third electric drive motors 26-1, 26-2 and 26-3 are configured to provide drive up to the maximum speed of vehicle 1. That is, each of the first, second and third electric drive motors 26-1, 26-2 and 26-3 are configured to provide drive across the full speed range of vehicle 1 (i.e. from stationary to the maximum speed of vehicle 1, in both the forward and reverse directions).

As such, drive system 24 may not comprise a disengagement mechanism for disengaging the first electric drive motor 26-1 from input drive shaft 27. An example of a typical disengagement mechanism is a clutch (e.g. a mechanical clutch). That is, in normal use, first electric drive motor 26-1 may remain continually mechanically engaged with input drive shaft 27. Put another way, the first electric drive motor 26-1 may be directly coupled to input drive shaft 27, or may be connected to a gearing between the input drive shaft 27 and first electric drive motor 26-1, the gearing having an appropriate fixed (e.g. single speed) gear ratio.

Drive system 24 may not comprise a disengagement mechanism for disengaging the second electric drive motor 26-2 from first axle half-shaft 28a. That is, in normal use, second electric drive motor 26-2 may remain continually mechanically engaged with first axle half-shaft 28a. In other words, no disengagement mechanism may be present along the first drive path 32a between the second electric drive motor 26-2 and wheel 4a. Put another way, the second electric drive motor 26-2 may be directly coupled to first axle half-shaft 28a, or may be connected to a gearing between the first axle half-shaft 28a and second electric drive motor 26-2, the gearing having an appropriate fixed (e.g. single speed) gear ratio.

Drive system 24 may not comprise a disengagement mechanism for disengaging the third electric drive motor 26-3 from second axle half-shaft 28b. That is, in normal use, third electric drive motor 26-3 may remain continually mechanically engaged with second axle half-shaft 28b. In other words, no disengagement mechanism may be present along the second drive path 32b between the third electric drive motor 26-3 and wheel 4b. Put another way, the third electric drive motor 26-3 may be directly coupled to second axle half-shaft 28b, or may be connected to a gearing between the second axle half-shaft 28b and the third electric drive motor 26-3, the gearing having an appropriate fixed (e.g. single speed) gear ratio.

Each of the first, second and third electric drive motors 26-1, 26-2 and 26-3 being configured to provide drive up to the maximum speed of vehicle 1 as described herein is advantageous because all three electric drive motors can be used simultaneously. This increases the efficiency of drive system 24—e.g. relative to a drive system having a plurality of electric drive motors but where each electric drive motor is only capable of providing drive within a sub-range of the vehicle's full speed range, and thus must be disengaged from the driven axle outside that sub-range (e.g. using a clutch). In addition, the absence of a disengagement mechanism (e.g. a clutch) associated with each of the first, second and third electric drive motors 26-1, 26-2 and 26-3—made possible by configuring each of the electric drive motors to provide drive across the full speed range of vehicle 1—reduces the weight of drive system 24. Desirable vehicle performance benefits (e.g. greater acceleration, greater top speed, and greater range) can be achieved by reducing the weight of drive system 24.

It will be understood that the first, second and third electric drive motors 26-1, 26-2 and 26-3 may be disconnected from their shafts during maintenance of the vehicle by detaching the mechanical connection between each electric drive motor and its respective shaft. However, when the vehicle is capable of being used for normal use each of the first, second and third electric drive motors 26-1, 26-2 and 26-3 cannot be disengaged from driving its respective shaft.

The first, second and third electric drive motors 26-1, 26-2 and 26-3 may be packaged together with differential 20. That is, the first, second and third electric drive motors 26-1, 26-2 and 26-3 and differential 20 may be included within the same physical container. This can advantageously reduce the weight of the drive system 24 for a vehicle, relative to a drive system in which the electric drive motors and the differential are individually (e.g. separately) packaged in multiple physical containers. First, less packaging material (e.g. magnesium or aluminium) can be used and therefore weight can be saved by virtue of having a single physical container, rather than multiple physical containers. Second, weight can be saved by using the same cooling circuit (e.g. radiators, cooling fluids, common sections of piping etc.) for the first, second and third electric drive motors 26-1, 26-2 and 26-3 and differential 20—rather than requiring each component to have its own cooling circuit. As described herein, desirable vehicle performance benefits (e.g. greater acceleration, greater top speed, and greater range) can be achieved by reducing the weight of drive system 24.

Drive system 24 may include input drive shaft 27, and/or first axle half-shaft 28a and second axle half-shaft 28a. Alternatively, the first, second and third electric drive motors 26-1, 26-2 and 26-3 and differential 20 could be packaged together as described herein and sold separately, and appropriate shafts (e.g. input drive shaft 27, first axle half-shaft 28a and second axle half-shaft 28b) subsequently inserted into appropriate inputs/outputs during vehicle assembly.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A drive system for a vehicle having a maximum speed, the drive system comprising:
   a first electric drive motor configured to drive both a first wheel and a second wheel of the vehicle;
   a differential coupled to the first electric drive motor, the differential being configured to split the drive provided by the first electric drive motor so as to form a first drive path from the differential to the first wheel and a second drive path from the differential to the second wheel;
   a second electric drive motor positioned along the first drive path and configured to drive the first wheel; and
   a third electric drive motor positioned along the second drive path and configured to drive the second wheel;
   wherein each of the first, second and third electric drive motors are configured to provide drive up to the maximum speed of the vehicle.

2. The drive system as claimed in claim 1, the differential being configured to allow the first wheel to rotate at a different speed to the second wheel.

3. The drive system as claimed in claim 1, wherein the drive system comprises:
   an input drive shaft along which the first electric drive motor is coupled;
   a first axle half-shaft along which the second electric drive motor is coupled; and
   a second axle half-shaft along which the third electric drive motor is coupled;
   wherein the differential connects the input drive shaft, the first axle half-shaft, and the second axle half-shaft.

4. The drive system as claimed in claim 3, wherein the differential is configured to transfer rotary motion of the input drive shaft driven by the first electric drive motor to the first axle half-shaft and the second axle half-shaft so as to, respectively, drive the first wheel and the second wheel.

5. The drive system as claimed in claim 3, wherein the first axle half-shaft is configured to transfer drive along the first drive path from the differential to the first wheel, and the second axle half-shaft is configured to transfer drive along the second drive path from the differential to the second wheel.

6. The drive system as claimed in claim 3, wherein:
   the first electric drive motor is configured to drive:
      the input drive shaft; and
      via the differential, the first axle half-shaft and the second axle half-shaft;
   the second electric motor is configured to drive the first axle half-shaft; and
   the third electric motor is configured to drive the second axle half-shaft.

7. The drive system as claimed in claim 3, wherein the drive system does not comprise a disengagement mechanism for disengaging the first electric drive motor from the input drive shaft.

8. The drive system as claimed in claim 3, wherein the drive system does not comprise a disengagement mechanism for disengaging the second electric drive motor from the first axle half-shaft.

9. The drive system as claimed in claim 3, wherein the drive system does not comprise a disengagement mechanism for disengaging the third electric drive motor from the second axle half-shaft.

10. The drive system as claimed in claim 1, wherein the first, second and third electric drive motors are packaged together with the differential.

11. The drive system as claimed in claim 1, wherein each of the first, second and third electric drive motors are configured to provide drive across the full speed range of the vehicle.

12. A vehicle comprising a first wheel and a second wheel, and a drive system for the vehicle having a maximum speed, the drive system comprising:
 a first electric drive motor configured to drive both a first wheel and a second wheel of the vehicle;
 a differential coupled to the first electric drive motor, the differential being configured to split drive provided by the first electric drive motor so as to form a first drive path from the differential to the first wheel and a second drive path from the differential to the second wheel;
 a second electric drive motor positioned along the first drive path and configured to drive the first wheel; and
 a third electric drive motor positioned along the second drive path and configured to drive the second wheel;
 wherein each of the first, second and third electric drive motors are configured to provide drive up to the maximum speed of the vehicle; and
 wherein the drive system is configured to drive the first wheel and the second wheel.

13. The vehicle as claimed in claim 12, the first wheel and the second wheel being rear wheels of the vehicle.

14. The vehicle as claimed in claim 12, the first wheel and the second wheel being front wheels of the vehicle.

15. The vehicle as claimed in claim 12, wherein the first wheel is coupled to a first axle half-shaft, along which the second electric drive motor is coupled, and the second wheel is coupled to a second axle half-shaft along which the third electric drive motor is coupled.

16. The vehicle as claimed in claim 12, the vehicle being an electric vehicle or a hybrid vehicle.

17. The vehicle as claimed in claim 12, wherein each of the first, second and third electric drive motors are configured to provide drive across the full speed range of the vehicle.

* * * * *